US 11,891,196 B2

(12) United States Patent
York et al.

(10) Patent No.: US 11,891,196 B2
(45) Date of Patent: Feb. 6, 2024

(54) SPACECRAFT SYSTEMS AND METHODS

(71) Applicant: Ball Aerospace & Technologies Corp., Boulder, CO (US)

(72) Inventors: Adam York, Broomfield, CO (US); Corey Juarez, Denver, CO (US)

(73) Assignee: Ball Aerospace & Technologies Corp., Boulder, CO (US)

(*) Notice: Subject to any disclaimer, the term of this patent is extended or adjusted under 35 U.S.C. 154(b) by 230 days.

(21) Appl. No.: 17/308,433

(22) Filed: May 5, 2021

(65) Prior Publication Data

US 2021/0347504 A1    Nov. 11, 2021

Related U.S. Application Data

(60) Provisional application No. 63/020,735, filed on May 6, 2020.

(51) Int. Cl.
| | | |
|---|---|---|
| *B64G 1/64* | (2006.01) | |
| *B64G 1/10* | (2006.01) | |
| *B64G 1/44* | (2006.01) | |
| *B64G 1/00* | (2006.01) | |

(52) U.S. Cl.
CPC ............ *B64G 1/641* (2013.01); *B64G 1/002* (2013.01); *B64G 1/1085* (2013.01); *B64G 1/443* (2013.01)

(58) Field of Classification Search
CPC ...... B64G 1/641; B64G 1/002; B64G 1/1085; B64G 1/443; B64G 1/10; B64G 1/66; B64G 1/34; B64G 2001/643
See application file for complete search history.

(56) References Cited

U.S. PATENT DOCUMENTS

| | | | |
|---|---|---|---|
| 4,854,526 A | 8/1989 | Rochefort | |
| 5,052,640 A | 10/1991 | Chang | |
| 6,138,951 A * | 10/2000 | Budris | B64G 1/645 |
| | | | 102/393 |
| 8,915,472 B2 | 12/2014 | Aston et al. | |
| 9,669,948 B2 * | 6/2017 | Vichnin | B64G 1/002 |
| 9,745,083 B2 * | 8/2017 | Smith | B64G 1/1007 |
| 10,407,190 B2 * | 9/2019 | Fernandez | B64G 1/641 |
| 11,345,489 B2 * | 5/2022 | Aston | B64G 1/1085 |
| 2002/0179776 A1 * | 12/2002 | Mueller | B64G 1/1085 |
| | | | 244/158.5 |
| 2015/0232205 A1 * | 8/2015 | Lively | B64G 1/002 |
| | | | 244/173.3 |
| 2017/0057669 A1 | 3/2017 | Vichnin et al. | |
| 2017/0096240 A1 * | 4/2017 | Cook | B64G 1/646 |
| 2021/0053702 A1 * | 2/2021 | Aston | B64G 1/641 |

FOREIGN PATENT DOCUMENTS

WO    WO-0189927 A1 * 11/2001 ............ B64G 1/002

* cited by examiner

*Primary Examiner* — Medhat Badawi
*Assistant Examiner* — Vicente Rodriguez
(74) *Attorney, Agent, or Firm* — Sheridan Ross P.C.

(57) ABSTRACT

Systems and methods for configuring, packaging, and deploying spacecraft are provided. More particularly, spacecraft are configured with statically mounted instruments. An end of the spacecraft to which the instruments are mounted is relatively distant from a spacecraft bus, and has a narrow width relative to the spacecraft bus. During launch multiple overlapping and interleaved spacecraft are disposed radially about a longitudinal axis of the launch vehicle.

20 Claims, 7 Drawing Sheets

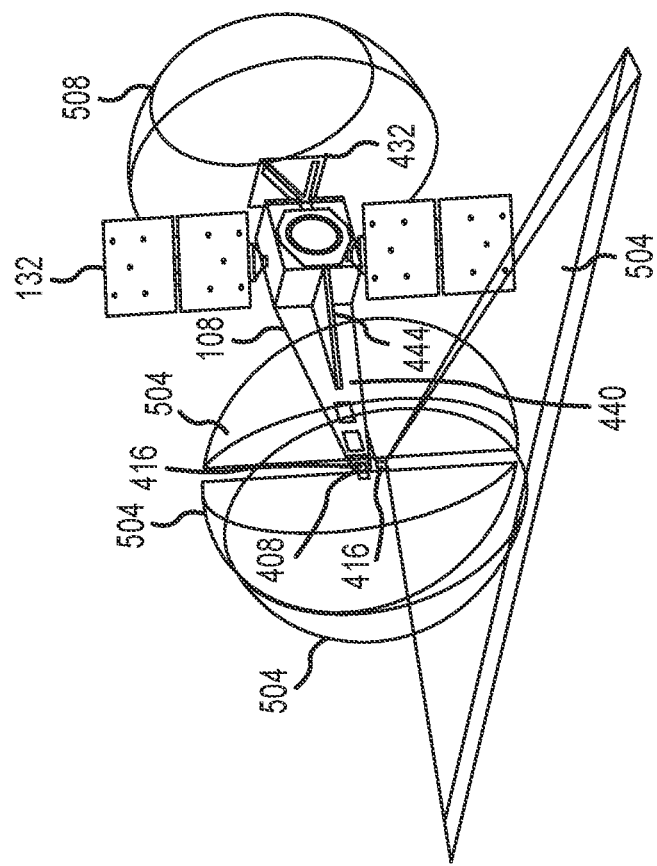
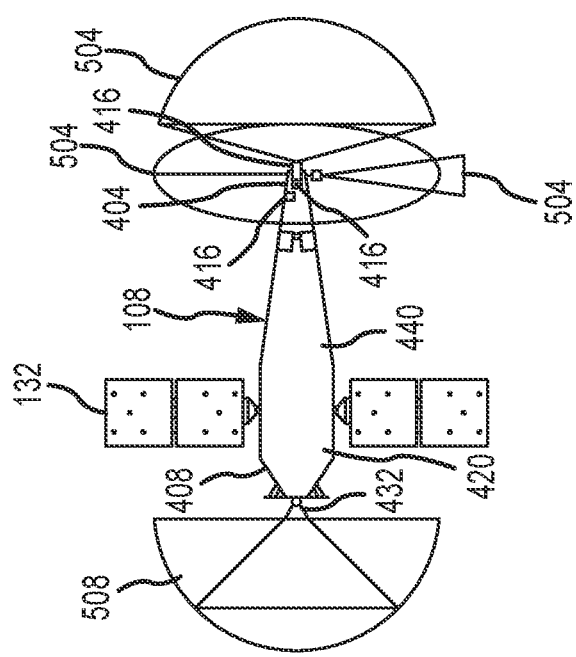
FIG.5B
FIG.5A

SPACECRAFT SYSTEMS AND METHODS

CROSS-REFERENCE TO RELATED APPLICATIONS

This application claims the benefit of U.S. Provisional Patent Application Ser. No. 63/020,735, filed May 6, 2020, the entire disclosure of which is hereby incorporated herein by reference.

FIELD

Systems and methods for locating sensors on spacecraft and facilitating mounting multiple spacecraft to a launch vehicle are provided.

SUMMARY

Spacecraft, including but not limited to satellites, are expensive to produce and launch. In an effort to drive down the costs associated with deploying spacecraft, efforts have been made to simplify their design. In addition, systems have been developed that allow multiple spacecraft to be deployed from a single launch vehicle.

In order to accommodate multiple spacecraft within a single launch vehicle, various arrangements have been proposed or implemented. For example, spacecraft have been stacked one on top of the other. This configuration allows the centers of mass of the spacecraft to be aligned with the center axis of the launch vehicle. However, a vertically stacked arrangement severely limits the height of each spacecraft. As another example, spacecraft have been arranged within a launch vehicle in a side-by-side configuration. As still another example, small spacecraft have been disposed radially about the center axis of the launch vehicle. A particular implementation of this type of arrangement is the Evolved Expendable Launch Vehicle Secondary Payload Adaptor or ESPA ring. Moreover, multiple ESPA rings can be stacked, one on top of the another. Although such arrangements can facilitate the deployment of multiple spacecraft from a single launch vehicle, they do not provide for efficient packaging of certain spacecraft configurations.

In addition to considerations related to enabling the efficient deployment of multiple spacecraft, individual spacecraft must be capable of carrying desired and necessary payload components. This often includes the need to provide deployable booms that enable sensitive instruments to be positioned away from sources of interference, such as power supplies and propulsion units, while maintaining as compact an overall structure as possible. However, the inclusion of deployable booms adds to the expense and complexity of the spacecraft.

Accordingly, it would be desirable to provide a spacecraft that was capable of being efficiently packaged within a launch vehicle fairing, while providing suitable instrument operating environments.

BRIEF DESCRIPTION OF THE DRAWINGS

FIGS. 5A and 5B depict sensor fields of view in accordance with embodiments of the present disclosure.

DETAILED DESCRIPTION

Figure 1:
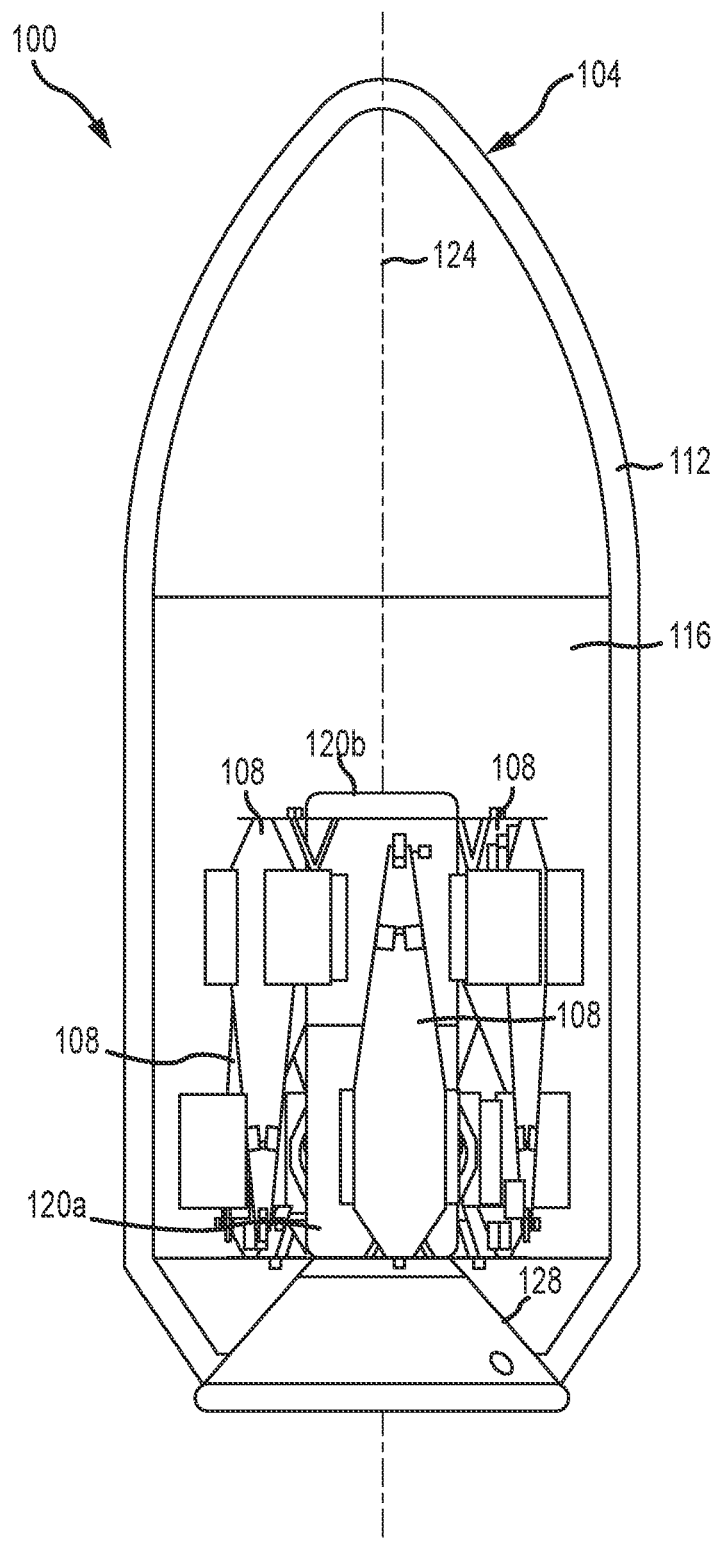
FIG. 1 depicts a launch vehicle and multiple spacecraft carried by the launch vehicle in accordance with embodiments of the present disclosure in a side cross section view.

FIG. 1 depicts portions of a spacecraft system 100 in accordance with embodiments of the present disclosure. More particularly, the figure depicts a payload portion of a launch vehicle 104 and multiple spacecraft 108 carried by the launch vehicle 104 in accordance with embodiments of the present disclosure in a side cross section view. As depicted in the figure, the launch vehicle 104 can include a nose cone or fairing 112 defining a payload volume 116 in which the spacecraft 108 or other payloads can be carried from a launch site to a location in orbit or in interstellar space. As examples but without limitation, the spacecraft 108 can include satellites, space vehicles, or the like that are intended for separation from the launch vehicle 104 once the launch vehicle 104 has arrived at a predetermined location. The spacecraft 108 are interconnected to either of a first payload or mounting ring 120a or a second payload or mounting ring 120b. In accordance with at least some embodiments of the present disclosure, the first mounting ring 120a is interconnected to a launch vehicle interface 128 provided as part of the launch vehicle 104 structure, and the second mounting ring 120b is stacked on top of the first mounting ring 120a.

Figure 2:
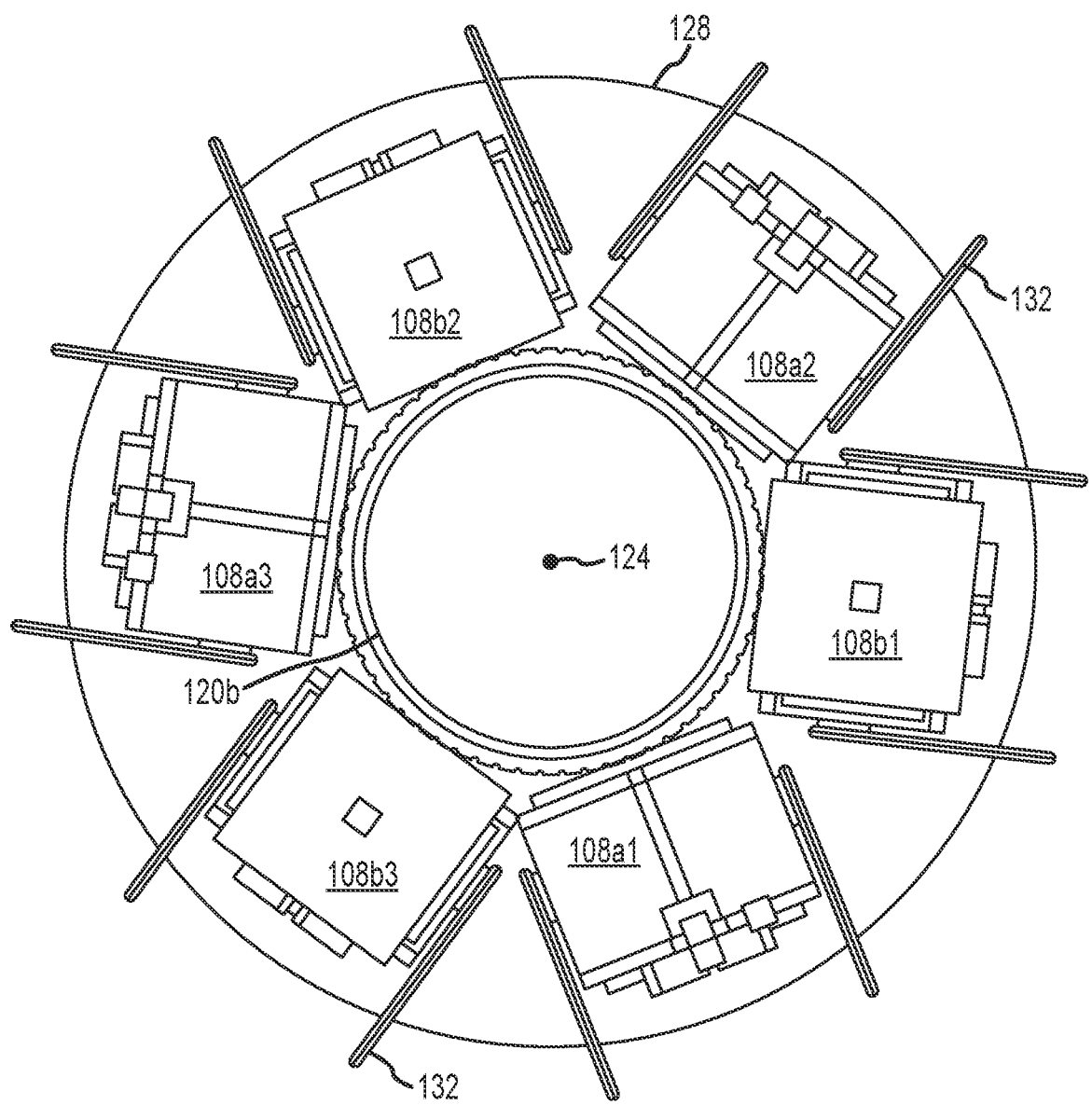
FIG. 2 depicts the launch vehicle and multiple spacecraft carried by the launch vehicle of FIG. 1 in an end view.
Figure 3A:
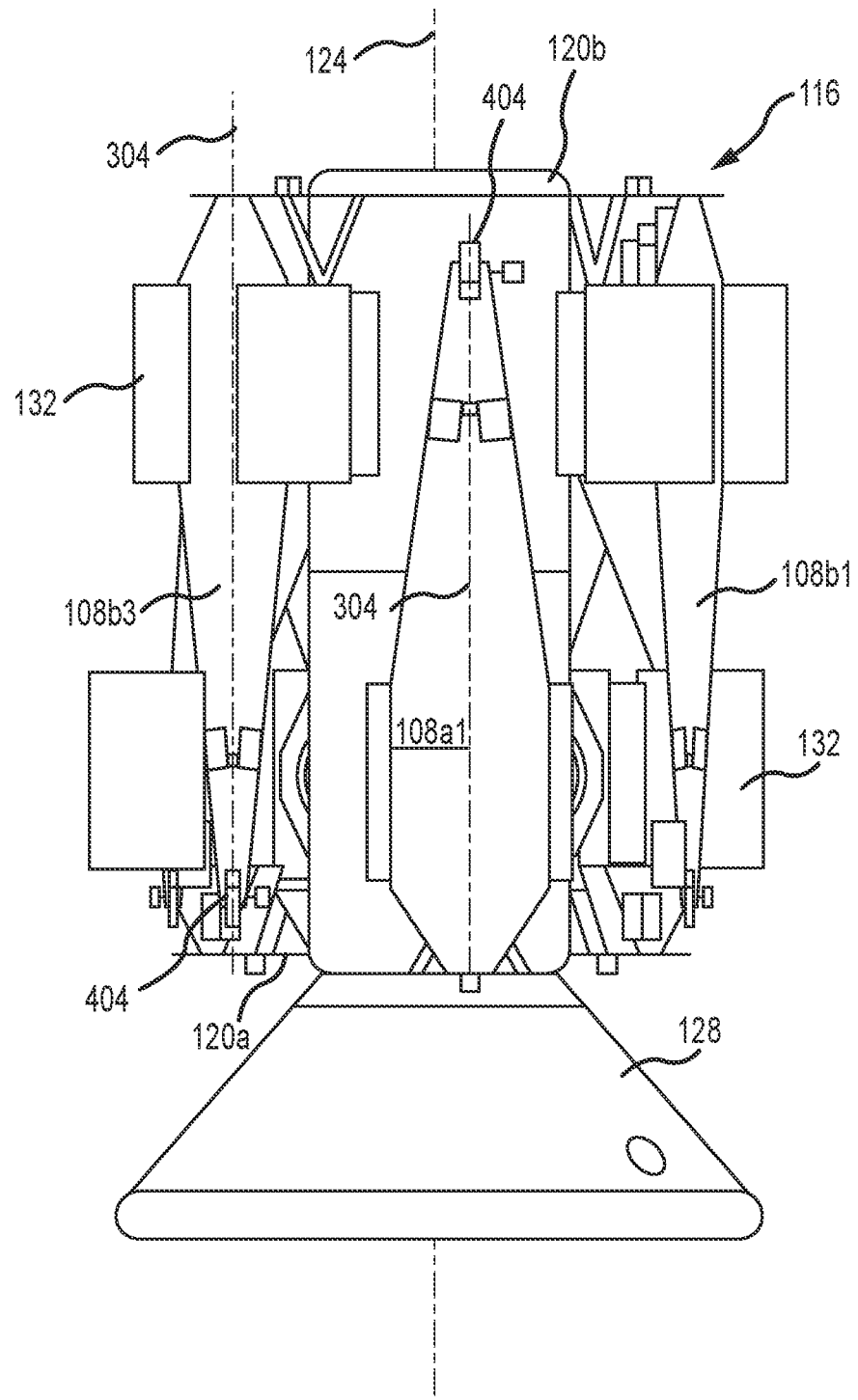
FIGS. 3A and 3B depict multiple payload rings and multiple spacecraft connected to the payload rings in side views in accordance with embodiments of the present disclosure.
Figure 3B:
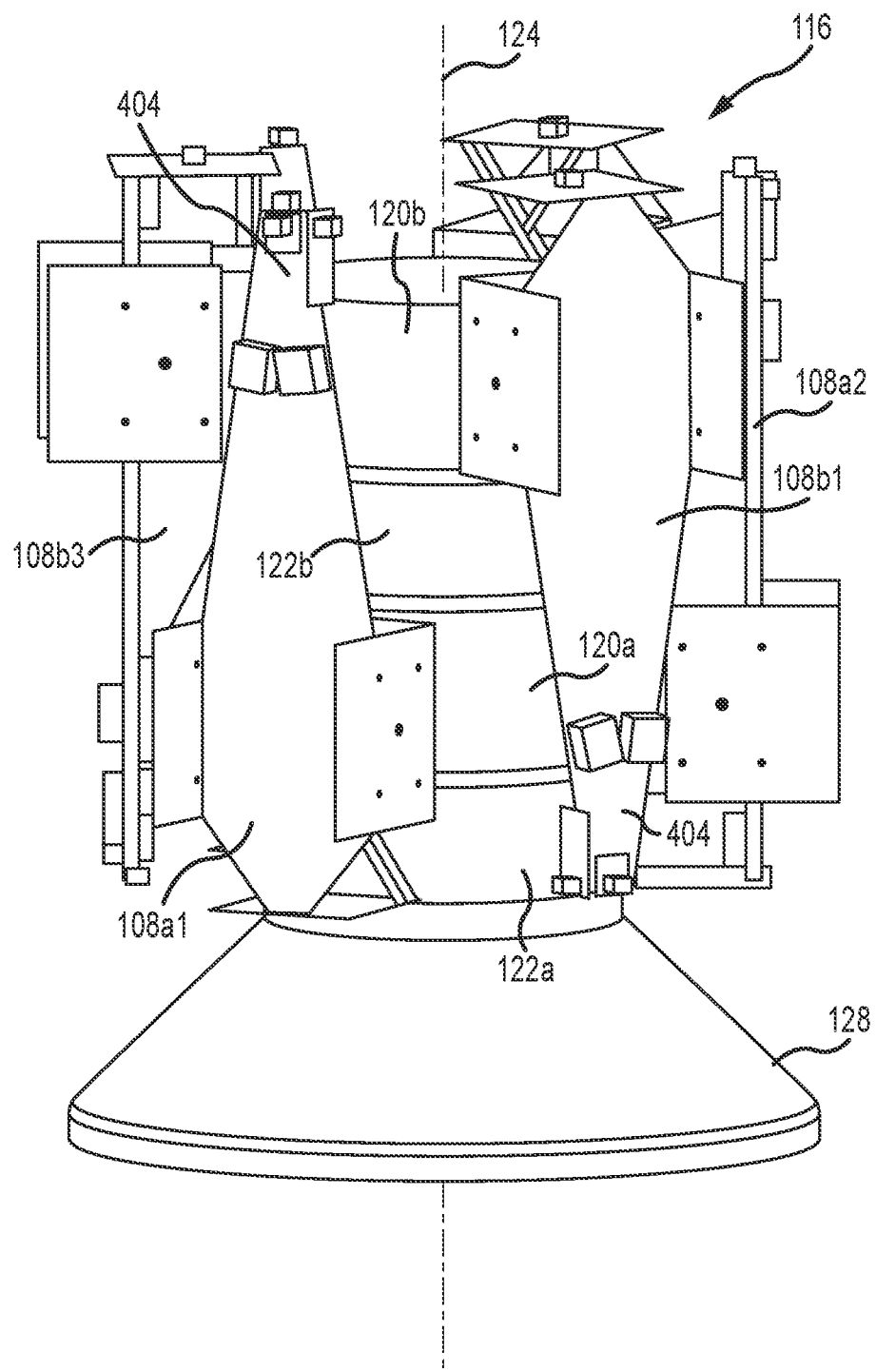

With reference now to FIGS. 2, 3A and 3B, particular features of the arrangement of the spacecraft 108 within the payload volume 116 are illustrated. In particular, FIG. 2 depicts an interior of the launch vehicle 104 payload volume 116 and multiple spacecraft 108 carried by the launch vehicle 104 as in the example configuration of FIG. 1 in an end view taken from the front or top of the launch vehicle 104. FIGS. 3A and 3B depict the interior of the launch vehicle 104 payload volume 116 and the interconnection between the spacecraft 108 and the payload rings or fixtures 120 in accordance with embodiments of the present disclosure in side views. As can be seen from these figures, this example configuration includes six spacecraft 108 disposed radially about a center or longitudinal axis 124 of the launch vehicle 104. A first set 108a of three spacecraft 108a1-108a3 are connected to the first mounting ring 120a using fixtures spaced radially about the mounting ring 120a, and are oriented in a first direction. A second set 108b of three spacecraft 108b1-108b2 are connected to the second mounting ring 120b using fixtures spaced radially about the mounting ring 120b, and are oriented in a second direction that is opposite the first direction. Moreover, longitudinal axes 304 of each of the spacecraft 108 are generally aligned with the longitudinal axis 124 of the launch vehicle 124. For instance, some or all of the longitudinal axes 304 of the spacecraft 108 can be parallel to the longitudinal axis 124 of the launch vehicle 104. As another example, the longitudinal axis 304 of some or all of the individual spacecraft 108 can be non-parallel to the longitudinal axis 124 of the space craft 104, but can be aligned with the longitudinal axis 124 of the launch vehicle 104 in that the axis 304 of an individual spacecraft 108 and the longitudinal axis 124 of the space craft 104 can define an individual plane. Although the figures depict the first 108*a* and second 108*b* sets of spacecraft 108 as each containing three spacecraft 108, other configurations are possible.

In accordance with embodiments of the present disclosure, the first mounting ring 120*a* is connected to a launch vehicle interface or platform 128, and the second mounting ring 120*b* is stacked on top of and is connected to the first mounting ring 120*a*. In accordance with further embodiments of the present disclosure, a spacer element 122 or set of spacer elements 122 can be disposed between the first 120*a* and second 120*b* mounting rings, to maintain a desired axial spacing (see FIG. 3A). Alternatively or in addition, a spacer element 122 can be disposed between the launch vehicle platform 128 and a mounting ring. For example, a first spacer element 122*a* can be disposed between the launch vehicle platform 128 and a first mounting ring 120*a*, and a second spacer element 122*b* can be disposed between the first mounting ring 120*a* and a second mounting ring 120*b* (see FIG. 3B). Moreover, the spacecraft 108 overlap and are interleaved with one another while connected to the launch vehicle, such that a section taken transverse to the longitudinal axis 124 of the launch vehicle 104 and through the interface of the first 120*a* and second 120*b* mounting rings intersects all of the spacecraft. In addition, a first end 404 of each of the spacecraft in the first set 108*a* is adjacent the second mounting fixture 120*b* or closer to the second mounting fixture 120*b* than to the first mounting fixture 120*a*, and a first end 404 of each of the spacecraft in the second set 108*b* is adjacent the first mounting fixture 120*a* or closer to the first mounting fixture 120*a* than to the second mounting fixture 120*b*. The first end 404 of each of the spacecraft 108*a* connected to the first mounting ring 120*a* generally points toward a first end of the launch vehicle 104, which includes the nose cone 112, while a first end 404 of each of the spacecraft 108*b* connected to the second mounting 120*b* generally points in the opposite direction, towards the launch vehicle 104 main engines (not shown). As depicted, spacecraft solar panels 132 can be maintained in a folded state when the spacecraft 108 are stowed in the payload volume 116. Also as depicted the spacecraft 108 associated with a particular launch vehicle 104 can be identical or similar to one another. Alternatively, the spacecraft 108 can differ from one another.

Figure 4:
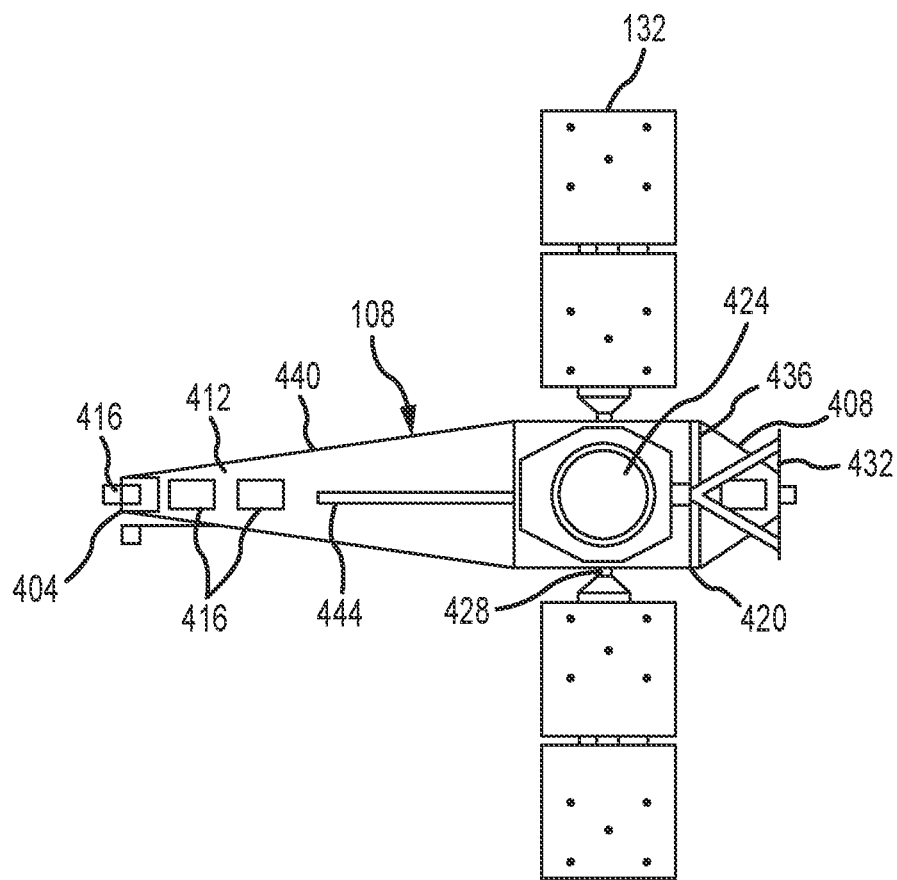
FIG. 4 depicts a spacecraft in accordance with embodiments of the present disclosure.

With reference also now to FIG. 4, each spacecraft 108 includes a first end 404 and a second end 408. An instrument platform 412 to which one or more instruments or sensors 416 are mounted is located at or towards the first end 404 of the spacecraft 108. A spacecraft bus 420 portion is located at or towards the second end 408 of the spacecraft 108. In accordance with embodiments of the present disclosure, the spacecraft bus 420 is connected to a mounting fixture or port of a mounting ring 120 during launch and delivery of the spacecraft 108 to a deployment location by the launch vehicle 104. Accordingly, the spacecraft bus 420 can include fixtures or features for mating with the mounting fixture of the mounting ring. The spacecraft bus 420 portion can include, for example, a power supply 424 and hinge points 428 for solar panels 132. Note that in FIG. 4 the solar panels 132 of the illustrated spacecraft 108 are depicted in a deployed state. In addition, an antenna or instrument 432, for example an Earth facing antenna or instrument, can be located on an Earth facing or base platform 436 at or adjacent the second end 408 of the spacecraft 108. The instrument platform 412 can be connected to the spacecraft bus 420 portion by a structural or spacer member 440. In general, the spacer member 440 extends from the spacecraft bus 420 to enable the instruments 416 to be positioned far enough away from the spacecraft bus 420 to ensure that electromagnetic interference from components located in the spacecraft bus 420 does not adversely affect the operation of the instruments 416. A single spacecraft 108 can include one or more instruments 416 of one or more types. The location of particular instruments 416 relative to other instruments 416 and to the spacecraft 108 components can be determined by the particular operating requirements of the instruments 416, including isolation requirements, field of view requirements, weight or the like.

In accordance with embodiments of the present disclosure, the spacer member 440 is fixed relative to the spacecraft bus 420 and the instrument platform 412. Thus, a location of the instrument platform 412 relative to the spacecraft bus 420 is fixed. In accordance with at least some embodiments of the present disclosure, the spacer member 440 forms some or all of the instrument platform 412. In accordance with still further embodiments of the present disclosure, the instruments 416 are fixed to the instrument platform 412. Moreover, the instruments 416 can have locations relative to the spacecraft bus 420 that are the same during operation of those instruments 416 as during launch. That is, the instruments 416 in accordance with at least some embodiments of the present disclosure are not deployed on booms. The spacer member 440 can include one or more stiffener members 444. Moreover, the spacer member 440 can be formed using various structures, including but not limited to aluminum panels having honeycomb cores, composite panels, interconnected struts, an integral beam, or any other material or structure that provides the required strength, stiffness, and weight requirements. The spacer member 440 and instrument platform 412 can also be configured in view of its interaction with the operational requirements of the instruments 416, such as instrument 416 operating wavelengths, shielding or shading requirements, or the like.

In general, it is desirable for a spacecraft to be relatively compact, in order to reduce the associated moment of inertia (MOI). In conventional spacecraft designs, this has often resulted in the adoption of cube or rectangular forms, with sensitive instruments positioned at the end of relatively flexible booms, in order to provide those instruments with a desired field of view and to ensure isolation from sources of EMI. In accordance with embodiments of the present disclosure, expensive, delicate, and failure prone booms are avoided or eliminated. Instead, instruments 416 are statically mounted to an instrument platform 412 that is spaced apart from the spacecraft bus 420 by a structural member 440. Moreover, the structural member 440 is itself static or fixed relative to the spacecraft bus 420 and is relatively stiff. In order to reduce the MOI of the spacecraft 108, the structural member 440, any stiffener members 444, and/or the platform 412 can feature a transverse dimension that decreases with increasing distance from the spacecraft bus 420. Accordingly, a width of the spacecraft 108 at the first end 404 can be several times or more less than a width of the spacecraft 108 at the second end 408. Alternatively or in addition, the mass and/or number of instruments 416 can be reduced with increasing distance from the spacecraft bus 420. Accordingly, the center of gravity of a spacecraft 108 in accordance with embodiments of the present disclosure can be maintained at a normal location. For example, but without limitation, the center of gravity of a spacecraft 108 can be centered within the spacecraft bus 420.

In addition to various benefits related to providing a relatively inexpensive, simple, robust, and reliable spacecraft 108 assembly, embodiments of the present disclosure provide packaging benefits. In particular, as described herein, multiple spacecraft 108 can be interleaved with one another and carried within the payload volume 116 of conventional launch vehicles 104 using standards compliant mounting structures or fixtures 120. As examples, but without limitation, sensitive instruments 416 can be located at least 2.5 meters from the spacecraft bus 420. Moreover, while a conventional spacecraft will have relative dimensions in L:W:H of about 1:1:1, a spacecraft in accordance with embodiments of the present disclosure can have, as an example but without limitation, relative dimensions of 5.9: 1.3:1 (L:W:H).

FIGS. 5A and 5B depict sensor 416 fields of view 504 in accordance with embodiments of the present disclosure. In particular, in addition to ensuring that EMI from spacecraft bus 420 components does not interfere with the operation of instruments 416 carried by the spacecraft 108, the locating of instruments 416 on an instrument platform 412 that is spaced apart from the spacecraft bus 420 by a spacer member 440 can ensure wide and/or multiple fields of view for the sensors 416. For example, embodiments of the present disclosure can provide a field of view to an instrument 416 that extends in multiple directions by using a fixed spacer member 440 to position the portion of the instrument platform 412 to which the instrument 416 is connected at a suitable location relative to the spacecraft bus 420. Moreover, if desired or required, the fields of view 504 of different instruments 416 can be overlapping, partially overlapping, and/or separated from one another. In addition, a field of view 508 of an instrument 432 at the second end 408 of the spacecraft 108 is depicted.

Figure 6:
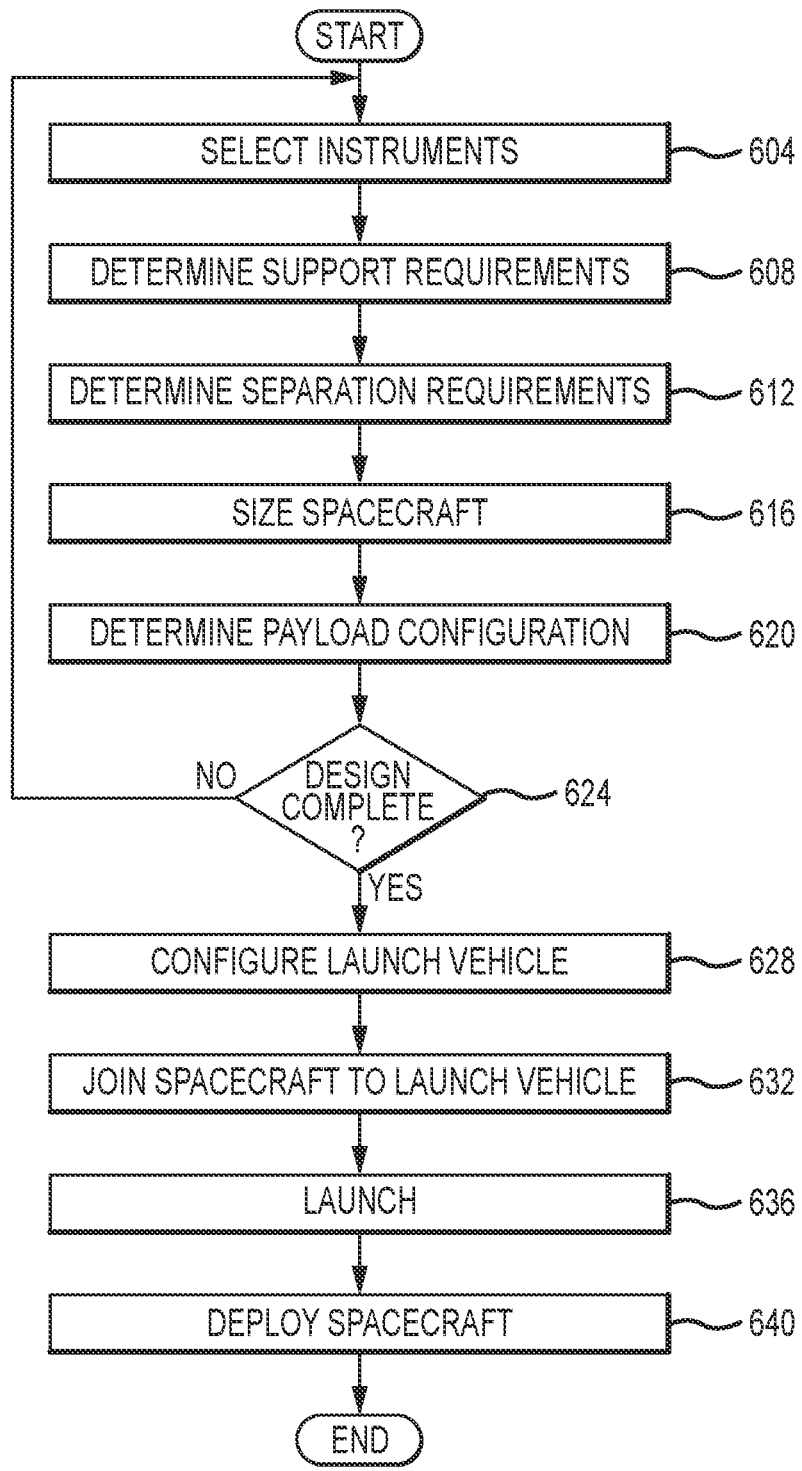
FIG. 6 depicts a method for configuring and deploying multiple spacecraft carrying sensors in accordance with embodiments of the present disclosure.

FIG. 6 depicts a method for developing and deploying multiple spacecraft 108 carrying sensors in accordance with embodiments of the present disclosure. Initially, an instrument or set of instruments 416 that will be carried on the instrument platform 412 of a spacecraft 108 are selected (step 604). Next, the requirements of operational support components, such as power supplies 424, communications equipment 432, control equipment, and other potentially interfering components that will be mounted to or contained within the spacecraft bus 420 are determined (step 608). A required separation to maintain desired isolation levels between the instruments 416 on the instrument platform 412 and the components of the spacecraft bus 420 is then determined (step 612). From the set of instruments 416, the sizes of those instruments 416, the support components, and the sizes of those components, the sizing of the spacecraft 108, including the sizing of the structural member 440 and instrument platform 412, is determined (step 616).

At step 620, the configuration of multiple spacecraft 108 and the number of mounting fixtures 120 within the payload volume 116 of the launch vehicle is determined. As can be appreciated by one of skill in the art after consideration of the present disclosure, the dimensions of the spacecraft 108 can be selected in view of the space available within the payload volume 116 of the launch vehicle 104. Accordingly, aspects of the dimensioning of spacecraft 108 and determining a packaging configuration for the spacecraft 108 within the payload volume 116 can be iterative. In general, embodiments of the present disclosure feature at least two mounting rings 120 that each have a plurality of radially disposed ports or fixtures spaced at regular intervals around an outside diameter of the mounting rings 120. The ports of a first one of the mounting rings 120 can be radially aligned with the ports of a second one of the mounting rings 120. Alternatively, the ports of one mounting ring 120 can be rotated relative to the ports of another mounting ring 120. For instance, the ports of a first mounting ring 120a can be aligned so that they fall between the radial locations of the ports of a second mounting ring 120b.

As noted, the process of dimensioning and configuring the packaging of the spacecraft 108 can be an iterative process. Accordingly, at step 624 a determination can be made as to whether the design process is complete. If not, for example if changes to the mission parameters have been made in the interim, or if it becomes apparent that revisions to the design may be beneficial for other reasons, the process returns to step 604. Otherwise, the process continues to the production of the spacecraft 108 and the configuration of the launch vehicle 104 (step 628).

At step 632, the spacecraft 108 are joined to the mounting rings 120 of the launch vehicle 104. This can include joining the spacecraft bus 420 of each spacecraft 108 in a first set of spacecraft 108a to mounting fixtures included as part of the first mounting ring 120a, and joining the spacecraft bus 420 of each spacecraft in a second set of spacecraft 108b to mounting fixtures included as part of the second mounting ring 120b. Optionally, an instrument platform 412 of each spacecraft in the first set of spacecraft 108b can be joined to fixtures included as part of the second mounting ring 120b, and an instrument platform 412 of each spacecraft in the second set of spacecraft 108b can be joined to fixtures included as part of the first mounting ring 120a.

The launch vehicle 104 can then be launched (step 636). Once the launch vehicle has arrived at the desired location, the spacecraft 108 can be deployed (step 640). As can be appreciated by one of skill in the art after consideration of the present disclosure, the spacecraft 108 can all be deployed at the same location at or about the same time, or sequentially as the launch vehicle 104 reaches the desired locations for different ones of the spacecraft 108. The process can then end.

In accordance with embodiments of the present disclosure, various standardized mounting fixture 120 components, such as but not limited to ESPA rings, can be used to mount the spacecraft 108 to the launch vehicle 104. For instance, as depicted in FIGS. 1-3, two ESPA rings or ESPA Grande rings can be stacked one on top of the other. Alternatively, one or more spacer elements can be interposed between adjacent mounting rings 120, to maintain axial spacing for the spacecraft 108. All or a subset of the radial ports of each of the mounting rings 120 can be utilized. For example, three of the radial ports of each ESPA ring in a pair of six port ESPA rings can be utilized to attach the spacecraft bus 420 portions of three spacecraft 108, enabling six spacecraft 108 to be carried within the payload volume 114. Mounting rings 120 having any number of ports or fixtures can be used. As examples, but without limitation, the ports can include 380 mm ESPA ring ports or 610 mm ESPA Grande ports. In addition, the length of the spacecraft 108 can extend to greater than the height of a standard spacer 120 by interleaving adjacent spacecraft 108. That is, embodiments of the present disclosure enable spacecraft 108 having dimensions that extend beyond standardized payload envelopes to be carried and deployed by a launch vehicle 104. In accordance with still other embodiments, more than two mounting fixtures 120 can be stacked on top of one another.

The spacecraft 108 carried by a launch vehicle 104 can be the same as or similar to one another. Alternatively, the spacecraft 108 in a first set of spacecraft 108a can be the same or similar to one another, while the spacecraft 108 in a second set of spacecraft 108b can be the same or similar to one another, but different from the spacecraft 108 in the first set of spacecraft 108a. In accordance with still other embodiments of the present disclosure, one or more spacecraft 108 in accordance with embodiments of the present disclosure can be carried in the payload volume 116 of a launch vehicle 104, at the same time that spacecraft or equipment of other configurations, including conventional configurations having deployable booms, cube satellites, etc., are carried in the payload volume 116 of the launch vehicle 104.

Advantages of spacecraft 108 configured in accordance with embodiments of the present disclosure include eliminating or reducing the number of complex, expensive, and failure prone boom components. In addition, spacecraft 108 as disclosed herein can be provided with a large MOI, for use with a gravity-gradient, attitude stabilization approach. The area available for antennas, including but not limited to planar array antennas, can be greater on a spacecraft 108 configured in accordance with embodiments of the present disclosure as compared to other designs. Moreover, greater area can be available for solar panels 132 for power generation. In addition, spacecraft 108 in accordance with embodiments of the present disclosure can be efficiently disposed within the payload volume 116 of a launch vehicle 104.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A spacecraft system, comprising:
a launch vehicle, the launch vehicle including first and second mounting rings located along a longitudinal axis of the launch vehicle;
a first spacecraft having first and second ends, wherein the first spacecraft is connected to the first mounting ring, wherein the first end of the first spacecraft is adjacent the second mounting ring, wherein a first plane that is perpendicular to the longitudinal axis of the launch vehicle is coincident with the first end of the first spacecraft and intersects the second mounting ring, wherein the second end of the first spacecraft is adjacent the first mounting ring, and wherein a second plane that is perpendicular to the longitudinal axis of the launch vehicle is coincident with the second end of the first spacecraft and intersects the first mounting ring; and
a second spacecraft having first and second ends, wherein the second spacecraft is connected to the second mounting ring, wherein the first end of the second spacecraft is adjacent the first mounting ring, wherein a third plane that is perpendicular to the longitudinal axis of the launch vehicle is coincident with the first end of the second spacecraft and intersects the first mounting ring, wherein the second end of the second spacecraft is adjacent the second mounting ring, and wherein a fourth plane that is perpendicular to the longitudinal axis of the launch vehicle is coincident with the second end of the second spacecraft and intersects the second mounting ring.

2. The spacecraft system of claim 1, wherein the launch vehicle further includes a platform, and wherein the first mounting ring is connected to the platform.

3. A spacecraft system, comprising:
a launch vehicle, the launch vehicle including first and second mounting rings located along a longitudinal axis of the launch vehicle;
a first spacecraft having first and second ends, wherein the first spacecraft is connected to the first mounting ring, wherein the first end of the first spacecraft is adjacent the second mounting ring, wherein a first plane that is perpendicular to the longitudinal axis of the launch vehicle is coincident with the first end of the first spacecraft and intersects the second mounting ring, and wherein the second end of the first spacecraft is adjacent the first mounting ring; and
a second spacecraft having first and second ends, wherein the second spacecraft is connected to the second mounting ring, wherein the first end of the second spacecraft is adjacent the first mounting ring, wherein a second plane that is perpendicular to the longitudinal axis of the launch vehicle is coincident with the first end of the second spacecraft and intersects the first mounting ring, wherein the second end of the second spacecraft is adjacent the second mounting ring, and wherein the second mounting ring is directly connected to the first mounting ring.

4. The spacecraft system of claim 2, wherein the second mounting ring is connected to the first mounting ring via at least a first spacer element.

5. The spacecraft system of claim 1, wherein the first spacecraft is included in a first plurality of spacecraft that are all connected to and radially disposed about the first mounting ring, and wherein the second spacecraft is included in a second plurality of spacecraft that are all connected to and radially disposed about the second mounting ring.

6. The spacecraft system of claim 5, wherein each spacecraft in the first plurality of spacecraft is adjacent to at least one spacecraft in the second plurality of spacecraft.

7. The spacecraft system of claim 6, wherein a spacecraft bus portion of each of the spacecraft in the first plurality of spacecraft is connected to the first mounting ring via a corresponding radial fixture, and wherein a spacecraft bus portion of each of the spacecraft in the second plurality of spacecraft is connected to the second mounting ring via a corresponding radial fixture.

8. The spacecraft system of claim 7, wherein the first end of each of the spacecraft includes at least one instrument.

9. The spacecraft system of claim 8, wherein for each spacecraft the first end of the spacecraft is fixed relative to the second end of the spacecraft by a spacer member.

10. The spacecraft system of claim 1, wherein a first width dimension of the first spacecraft along a first direction perpendicular to the longitudinal axis of the launch vehicle and proximate to the first end of the first spacecraft is less than a second width dimension of the first spacecraft taken along the first direction and proximate to the second end of the first spacecraft.

11. A method for deploying a spacecraft, comprising:
providing a first spacecraft having a bus portion and a first end portion, wherein the first spacecraft includes a power component in the bus portion and a sensor component in the first end portion, and wherein the bus portion is wider than the first end portion;

providing a second spacecraft having a bus portion and a first end portion, wherein the second spacecraft includes a power component in the bus portion and a sensor component in the first end portion, and wherein the bus portion is wider than the first end portion;

mounting the bus portion of the first spacecraft to a first mounting ring of a launch vehicle; and mounting the bus portion of the second spacecraft to a second mounting ring of the launch vehicle, wherein the first and second mounting rings are stacked on top of one another along a longitudinal axis of the launch vehicle, wherein the first spacecraft has first and second ends, wherein a first plane that is perpendicular to a longitudinal axis of the launch vehicle is coincident with the first end of the first spacecraft and intersects the second mounting ring, wherein the second spacecraft has first and second ends, and wherein a second plane that is perpendicular to the longitudinal axis of the launch vehicle is coincident with the first end of the second spacecraft and intersects the first mounting ring.

12. The method of claim 11, further comprising:

launching the launch vehicle;

deploying the first spacecraft into orbit about the Earth, wherein a location of the first end portion of the first spacecraft relative to the bus portion of the first spacecraft while launching the launch vehicle is the same as after deploying the first spacecraft into orbit about the Earth; and operating the sensor component, wherein the sensor component has a field of view that extends in multiple directions relative to the first spacecraft.

13. The method of claim 11, further comprising:

wherein the first spacecraft is part of a first plurality of spacecraft, wherein each spacecraft in the first plurality of spacecraft includes a bus portion and a first end portion, wherein each spacecraft in the first plurality of spacecraft includes a power component in the bus portion and a sensor component in the first end portion, and wherein the bus portion is wider than the first end portion;

wherein the second spacecraft is part of a second plurality of spacecraft, wherein each spacecraft in the second plurality of spacecraft includes a bus portion and a first end portion, wherein the second spacecraft includes a power component in the bus portion and a sensor component in the first end portion, and wherein the bus portion is wider than the first end portion;

mounting the bus portion of each spacecraft in the first plurality of spacecraft to the first mounting ring of the launch vehicle, wherein the first end portion of each spacecraft in the first plurality of spacecraft is nearer a nose cone of the launch vehicle than the bus portion; and mounting the bus portion of each spacecraft in the second plurality of spacecraft to the second mounting ring of the launch vehicle, wherein the bus portion of each spacecraft in the second plurality of spacecraft is nearer the nose cone of the launch vehicle than the first end portion, wherein the spacecraft of the first plurality of spacecraft are radially interleaved with the spacecraft of the second plurality of spacecraft about the longitudinal axis of the launch vehicle such that each spacecraft in the first plurality of spacecraft is separated from a next spacecraft in the first plurality of spacecraft by one spacecraft in the second plurality of spacecraft.

14. The spacecraft system of claim 3, wherein a third plane that is perpendicular to the longitudinal axis of the launch vehicle is coincident with the second end of the first spacecraft and intersects the first mounting ring.

15. The spacecraft system of claim 14, wherein a fourth plane that is perpendicular to the longitudinal axis of the launch vehicle is coincident with the second end of the second spacecraft and intersects the second mounting ring.

16. The spacecraft system of claim 3, wherein the first spacecraft is included in a first plurality of spacecraft that are all connected to and radially disposed about the first mounting ring, and wherein the second spacecraft is included in a second plurality of spacecraft that are all connected to and radially disposed about the second mounting ring.

17. The spacecraft system of claim 16, wherein each spacecraft in the first plurality of spacecraft is adjacent to at least one spacecraft in the second plurality of spacecraft.

18. The spacecraft system of claim 17, wherein a spacecraft bus portion of each of the spacecraft in the first plurality of spacecraft is connected to the first mounting ring via a corresponding radial fixture, and wherein a spacecraft bus portion of each of the spacecraft in the second plurality of spacecraft is connected to the second mounting ring via a corresponding radial fixture.

19. The spacecraft system of claim 18, wherein the first end of each of the spacecraft includes at least one instrument.

20. The spacecraft system of claim 3, wherein a first width dimension of the first spacecraft along a first direction perpendicular to the longitudinal axis of the launch vehicle and proximate to the first end of the first spacecraft is less than a second width dimension of the first spacecraft taken along the first direction and proximate to the second end of the first spacecraft.

* * * * *